United States Patent
Ruzon et al.

(10) Patent No.: US 7,970,213 B1
(45) Date of Patent: Jun. 28, 2011

(54) METHOD AND SYSTEM FOR IMPROVING THE RECOGNITION OF TEXT IN AN IMAGE

(75) Inventors: Mark A. Ruzon, Mountain View, CA (US); Supratik Bhattacharya, Mountain View, CA (US)

(73) Assignee: A9.Com, Inc., Palo Alto, CA (US)

( * ) Notice: Subject to any disclaimer, the term of this patent is extended or adjusted under 35 U.S.C. 154(b) by 1072 days.

(21) Appl. No.: 11/804,917

(22) Filed: May 21, 2007

(51) Int. Cl.
*G06K 9/72* (2006.01)
*G06K 9/68* (2006.01)

(52) U.S. Cl. .................. 382/229; 382/309; 382/217

(58) Field of Classification Search .......... 382/229, 382/309, 310, 304, 305, 209, 217, 218
See application file for complete search history.

(56) References Cited

U.S. PATENT DOCUMENTS

| | | | |
|---|---|---|---|
| 5,519,786 A * | 5/1996 | Courtney et al. | 382/159 |
| 5,548,700 A * | 8/1996 | Bagley et al. | 715/255 |
| 7,031,553 B2 * | 4/2006 | Myers et al. | 382/289 |
| 7,650,035 B2 * | 1/2010 | Vincent et al. | 382/225 |

OTHER PUBLICATIONS

"Detecting and Reading Text in Natural Scenes" by Xiangrong Chen and Alan L. Yuille, *Proceedings of IEEE Conference on Computer Vision and Pattern Recognition*, vol. 2, pp. 366-373, (2004).

* cited by examiner

*Primary Examiner* — Jon Chang
(74) *Attorney, Agent, or Firm* — Kilpatrick Townsend & Stockton LLP

(57) ABSTRACT

Various embodiments of the invention describe a method, system and computer-readable storage medium containing instructions for improving the recognition of text present in an image. The image is processed by applying different operators to the image to obtain multiple processed versions of the image. Thereafter, characters and location information of the characters from each of the multiple processed versions of the image are obtained. The location information includes the pixel coordinates of the characters in the text. The text present in the image is edited, based on the relative location of the characters, to improve the recognition of the text in the image.

24 Claims, 5 Drawing Sheets

METHOD AND SYSTEM FOR IMPROVING THE RECOGNITION OF TEXT IN AN IMAGE

FIELD OF THE INVENTION

The invention relates, in general, to optical character recognition. In particular, the invention relates to a method and system for improving the recognition of text in an image.

BACKGROUND

Optical Character Recognition (OCR) systems are generally used to detect text present in an image. An OCR system detects text present in the image and converts the text in the image into its equivalent electronic representation. The electronic representation can be stored and manipulated on a computer or an equivalent data processing machine. In order to accurately recognize the text in an image using OCR, the image should be of a high quality. The quality of the image depends on various factors such as the power of the lens, light intensity variation, relative motion between the camera and text, focus, and so forth. An OCR system can accurately detect text in good quality images, captured with mega-pixel cameras or scanned with high quality flatbed scanners, which have uniform intensity, no relative motion, and good focus. Conversely, an OCR system generally misinterprets text in poor quality images with relative motion between the camera-and-text, high level of intensity variations, and poor focus. Poor quality images are generally captured by using low-resolution digital cameras or mobile phones with built-in digital cameras or by unskilled users. Moreover, since an OCR system cannot perform semantic analysis of the text present in an image for mapping detected text onto some standard character, the OCR system cannot assign meaning to the text in many signs that have a stylized appearance, such as retailer product signs. This results in misinterpretation of the text in the image, which may include errors such as splitting a word into two separate words, concatenating two words into one word, missing characters in a word, loss of adjacency information between words, and so forth.

A known method for improving the quality of an image before sending it to an OCR system is disclosed in *Proceedings of IEEE Conference on Computer Vision and Pattern Recognition*, vol. 2, pp. 366-373, 2004 titled, "Detecting and Reading Text in Natural Scenes". The paper discusses an algorithm for detecting and reading text in natural images. The algorithm includes collecting a set of images. The set of images is analyzed and detected text is extracted from it. The statistical analysis of the text is performed to determine the image features that are reliable indicators of text and have low variation among them. Another known method of improving the text detected by an optical character recognition system includes comparing words or phrases found in an image to a dictionary or database, and correcting words that are relatively close to known words. However, these methods do not deal with the editing of text in a context-independent manner, or with the inference of higher-level information such as identifying a retailer based on the physical layout of text in an image.

In light of the above discussion, there is a need for a method, system and computer program product for improving recognition of text in captured images, using low-quality image capture instruments, such as mobile phones with cameras and low-resolution digital cameras.

SUMMARY

An object of the invention is to provide a method, system and computer program product for improving the recognition of text present in an image.

Another object of the invention is to provide a method, system and computer program product for obtaining information, such as price and store information, from an image.

Various embodiments of the invention describe a method, system and computer program product for improving the recognition of text present in an image. Different operators are applied to the image to obtain multiple processed versions of the image. Thereafter, characters and location information of the characters from each of the multiple processed versions of the image are obtained. The location information includes the pixel coordinates of the characters in the text. The characters are arranged in a sequence that preserves all or most of the adjacency information in the text. The text present in the image is edited, based on the relative location of the characters, to improve the recognition of text in the image.

In another embodiment, a method is described for obtaining information, such as price, product code, manufacturer's name, retailer's name and so forth, from the image. The method includes processing the image by applying different operators on the image to obtain multiple processed versions of the image. The method also includes obtaining characters and location information of the characters from each of the multiple processed versions of the image. Further, the method includes searching for a match corresponding to the location information of the text in a domain database. The domain database includes a set of templates that includes location information for each set of patterns. Thereafter, the information is obtained in response to the match by the knowledge of where it is located in the image.

BRIEF DESCRIPTION OF THE DRAWINGS

The embodiments of the invention will hereinafter be described in conjunction with the appended drawings, provided to illustrate and not to limit the invention, wherein like designations denote like elements, and in which.

DETAILED DESCRIPTION

While the embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

Figure 1:
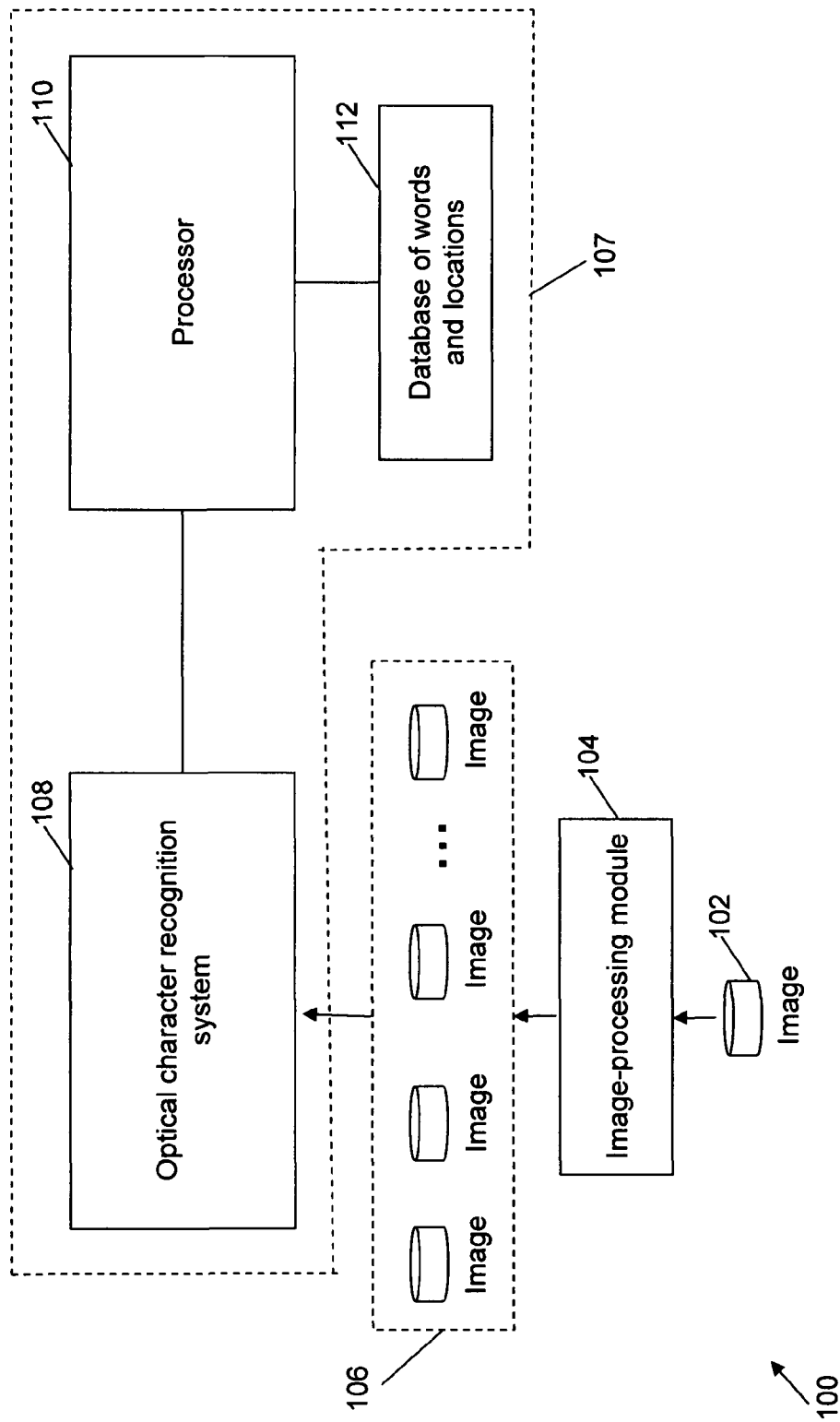
FIG. 1 is an exemplary environment in which various embodiments of the invention may be practiced.

FIG. 1 is an environment 100 in which various embodiments of the invention may be practiced. Environment 100 includes an image 102, an image-processing module 104, multiple processed versions 106 of image 102, and a system 107. System 107 includes an optical character recognition system 108 and a processor 110. System 107 further includes a database of words and locations 112. Image 102 may include text along with non-textual image objects. Image 102 can be captured using a camera device such as a digital camera, mobile phone with built-in camera and so forth. Image-processing module 104 applies different operators to image 102 to form multiple processed versions 106 of image 102. Examples of the operators include the Laplacian-of-Gaussian filter, thresholding filters, and so forth. These operators enhance or mitigate different characteristics of image 102. Examples of the characteristics include intensity, blurriness, and so forth. Multiple processed versions 106 of image 102, formed by applying operators to image 102, are processed by optical character recognition system 108 for detection of text in each multiple processed versions 106 of image 102. Optical character recognition system 108 recognizes text in each multiple processed version 106 of image 102 to form text comprising a set of characters and location information of the characters in image 102. Processor 110 analyzes and processes the detected location information of the characters in the set of text using a database of words in order to improve the recognition of the text in image 102. The database of words and locations 112 includes a set of words through which processor 110 can, search for matches corresponding to words present in the set of text and a set of locations to recognize specific configurations of text such as store labels.

Figure 2:
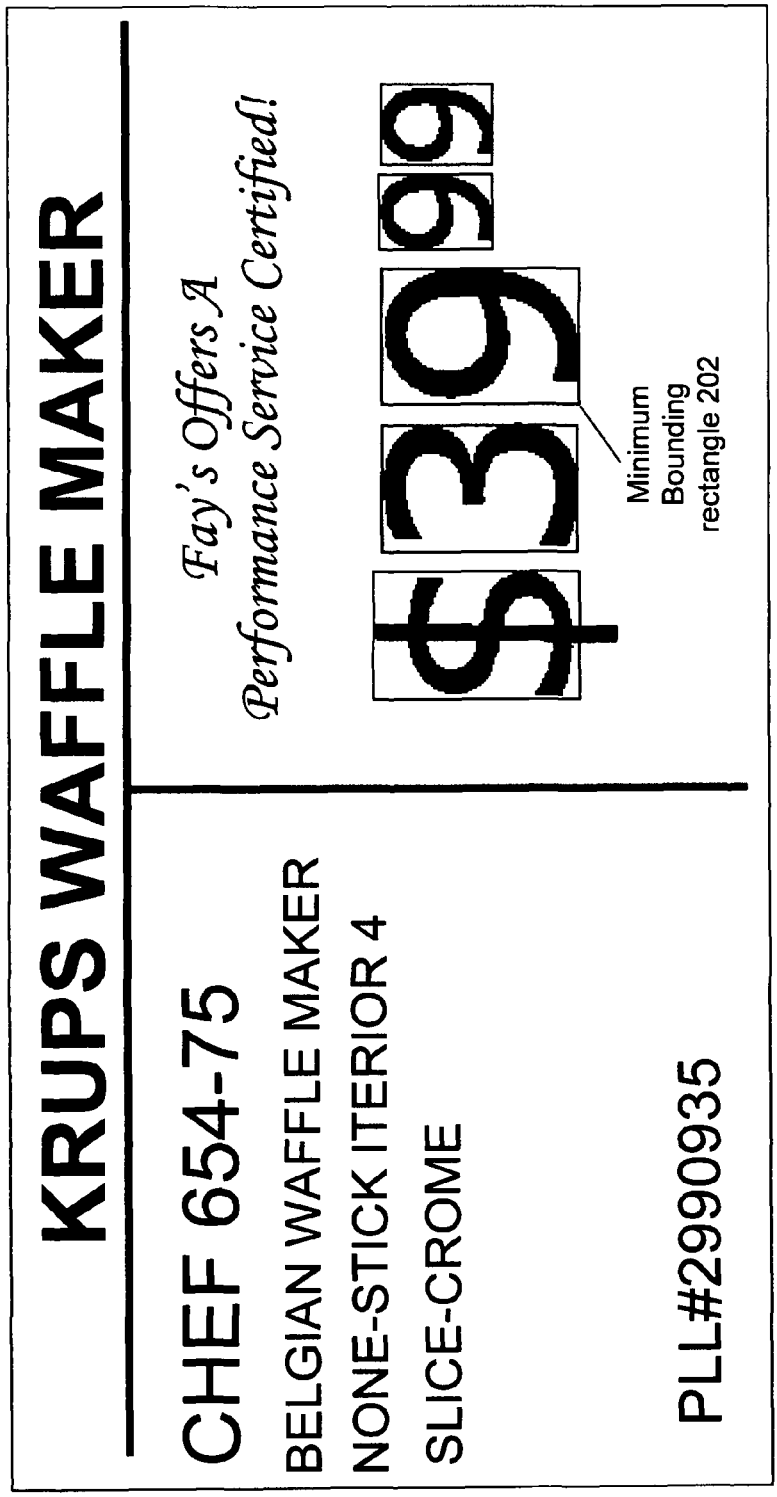
FIG. 2 is an exemplary image of a product tag of a retailer's product, in accordance with an embodiment of the invention.

FIG. 2 is an exemplary image 102 of a product tag of a retailer's product, in accordance with an embodiment of the invention. Image 102 may be captured using a mobile phone with a built-in camera. Image 102 may be analyzed to obtain layout information of the product tag. The layout information of image 102 includes information regarding pixel coordinates of text indicating information such as price, product specification, manufacturer's name, product code, and so forth. For detection of text in image 102, each character in the text in image 102 may be enclosed in a minimum bounding rectangle, such as minimum bounding rectangle 202, which encloses digit '9' in price information '$39$^{99}$'. The minimum bounding rectangle 202 is provided by optical character recognition system 108 and may be used in the process of calculating distance between two characters, calculating the height of a character and so forth.

Figure 3:
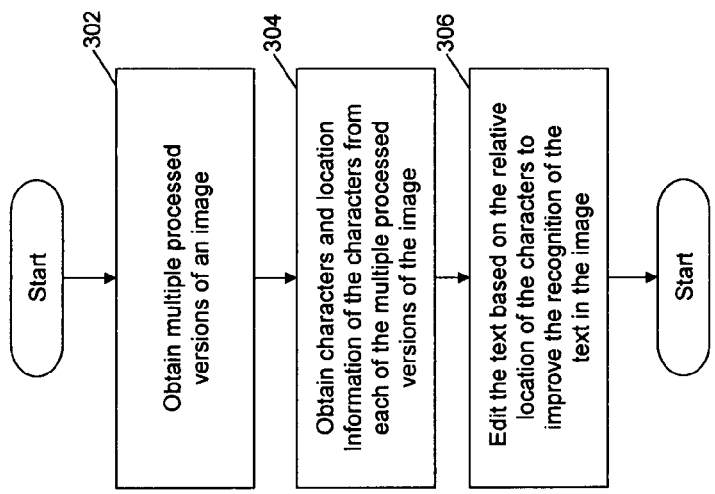
FIG. 3 is a flowchart of a method for improving the recognition of text present in an image, in accordance with an embodiment of the invention.

FIG. 3 is a flowchart of a method for improving the recognition of text present in image 102, in accordance with an embodiment of the invention. At step 302, multiple processed versions 106 of image 102 are obtained by applying different operators to image 102. These operators are applied by image-processing module 104 to improve at least one characteristic of image 102. This improvement affects the output text detected by optical character recognition system 108. At step 304, characters and location information of the characters in each multiple processed version 106 of image 102 are obtained by processor 110. The location information of the characters includes information of pixel coordinates of the characters present in the text in image 102. At step 306, the text in image 102 is edited, based on the characters in the text and relative location of the characters obtained from multiple processed versions 106 of image 102 to improve the recognition of the text in image 102. The relative location of characters may include distance between two characters and alignment of the characters in the text.

In an embodiment of the invention, text may be edited by removing the space between two words. For example, based on the horizontal distance between the two words, a first word and a second word, which are adjacent to each other in the text, are concatenated by processor 110. The horizontal distance between two words may be the width of the minimum bounding rectangle of the space between the first word and the second word. The space between the first word and the second word is removed to form a single word if the horizontal distance between the two words is less than a predefined separation threshold. For example, in image 102 shown in FIG. 2, consider that the first word is "KRUPS" and the second word is "WAFFLE", which are adjacent to each other. If the width of the space between the words is less than the predefined separation threshold, then the first and the second words will be concatenated to form a single word "KRUPSWAFFLE".

The predefined separation threshold may depend on the height of the last character of the first word and the first character of the second word. In an embodiment of the invention, the predefined separation threshold is equal to 35% of the larger of the heights of the last character of the first word "KRUPS" and the height of the first character of the second word "WAFFLE". Similarly, consider the two words "MAKER" and "Performance" on the third line in image 102. As the distance between the two words is very large relative to the heights of the characters "R" and "P", these words are not potential candidates for concatenation.

In another embodiment of the invention the first and second words, having been detected as separate entities by the optical character recognition system 108, are joined by combining them into a single entity based on their horizontal distance and vertical alignment. The first and second words are joined if a vertical overlap of the last character of the first word and the first character of the second word is greater than a predefined percentage of a function of the minimum bounding rectangles' heights, and the horizontal distance between the end of the first word and the beginning of the second word is less than the predefined separation threshold. In an embodiment, if the vertical overlap between the last character of the first word and the first character of the second word is at least 45% of the larger of the rectangles' heights, and if the horizontal separation between these two rectangles is less than 150% of the larger of the rectangles' heights, then the two words will be joined into a single entity. Furthermore, if the horizontal separation is larger than the predefined separation threshold, a space whose minimum bounding rectangle is adjacent to the previous two rectangles will be inserted between the two words.

In another embodiment of the invention two lines of text detected as separate entities by the optical character recognition system are joined into a paragraph by processor 110, based on the alignment of the text. If the average heights of the characters in the two lines are within a predefined percentage of each other, and if the distances between pairs of vertically aligned characters is less than a function of the larger of the heights of the characters in the two lines, then the two lines of text will be joined into a paragraph by processor 110 with space between the last word of the first line and the first word of the second line. The two lines are combined such that the lower line of the two lines is defined to be adjacent to and follows the upper line. For example, in FIG. 2, the line "BELGIAN WAFFLE MAKER" and the line "NONE-STICK ITERIOR 4" would be joined by processor 110 into a single paragraph of text "BELGIAN WAFFLE MAKER NONE-STICK ITERIOR 4".

In yet another embodiment of the invention, a single word in the text is split by processor 110 into two words based on the horizontal distance between two adjacent characters in the word. If the horizontal distance between two adjacent characters is greater than the predefined separation threshold, the word is split into two words by introducing a space between the two adjacent characters. For example, consider a word "BARHAT" where the horizontal distances between adjacent characters are 7, 6, 11, 6, and 5, respectively, and the height of the characters is 18 pixels each. As the distance between characters "R" and "H" is greater than a predefined distance of 50% of the characters' heights in image 102 and greater than a predefined distance of 50% of the average horizontal distance of 7, a space will be added to the word "BARHAT" to create the phrase "BAR HAT".

In yet another embodiment of the invention, processor 110 replaces a character in a word in the text with a group of characters based on the width of the character. The width of a character is compared to a predefined width threshold. The predefined width threshold is based on the width of other characters in the word. The ratio of the width of the character to the predefined width threshold is rounded to the nearest integer. Thereafter, a group of characters, with the number of characters equal to the nearest integer, is substituted by processor 110 in the word. The group of characters is allowed by processor 110 to match any characters when considering potential matches found in database of words and locations 112. For example, consider a word 'face' in which the character 'c' has a width of 60 pixels and each of the other three characters has a width of 20 pixels. Suppose that the predefined width threshold is 20 pixels. The ratio of the width of the character 'c' (60 pixels) to the predefined width threshold (20 pixels) is 3. Therefore, the processor substitutes the character 'c' with three characters. These three characters along with the remaining three characters (T, 'a' and 'e') are matched with all the words in the database of words and locations 112 to form a meaningful word. Hence, the character 'c' can, in one embodiment, be substituted with the group 'cad' to form the word 'Facade'.

In yet another embodiment of the invention, a monetary value corresponding to a numeric representation in the text is identified by processor 110. The height of each digit in the numeric representation is detected. If the heights of the last two digits are a predefined percentage less than the heights of the previous digits in the numeric representation, then a decimal point is inserted between the last two digits and the previous digits to detect the price accurately, corresponding to the numeric representation. For example, in FIG. 2, the price is shown as $39^{99}$. If the heights of the last two digits 99 are less than a predefined percentage (for example, 55%) of the heights of the previous digits 39, then a decimal point is inserted between digits 39 and 99, resulting in the monetary representation of $39.99.

Figure 4:
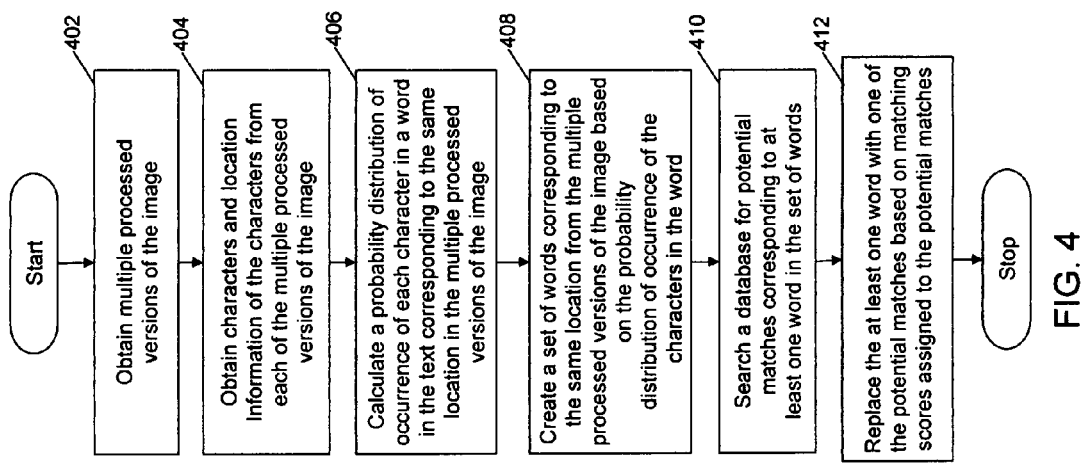
FIG. 4 is a flowchart of a method for improving the recognition of text present in an image, in accordance with another embodiment of the invention.

FIG. 4 is a flowchart of a method for improving recognition of text present in image 102, in accordance with another embodiment of the invention. At step 402, image 102 is processed by image-processing module 104 to obtain multiple processed versions 106 of image 102. Image-processing module 104 applies different operators to image 102 to form multiple processed versions 106 of image 102. These operators affect at least one characteristic of image 102. At step 404, characters and location information of the characters from each multiple processed version 106 of image 102 is obtained by optical character recognition system 108. The location information of the characters includes information regarding the pixel coordinates of the characters in the text. At step 406, a probability distribution of occurrence of each character in a word in the text corresponding to the same location of the character in multiple processed versions 106 of image 102 is calculated by processor 110. In an embodiment of the invention, only characters with area greater than a predefined threshold are taken into consideration for calculating probability of occurrence of characters in a word. For example, if a character in the word does not overlap corresponding characters in other multiple processed versions of the image by at least 50%, then the character is not included in calculating the probability of occurrence of characters in the word. The probability of occurrence of a character corresponding to a particular location in image 102 is proportional to the number of times optical character recognition system 108 detects the same character in the multiple processed versions 106 of image 102. For example, consider that the output of optical character recognition system 108, for two processed versions of an image, results in the words "INVEST" and "INVEST". The probability distribution of characters in the output in the format ["Character", Percentage] can be calculated as {["/", 50%], ["I", 50%]}, {["N", 100%]}, {["V", 100%]}, {["E", 100%]}, {["S", 100%]}, and {["T", 100%]}. Since "/" is a punctuation mark we may assign "I" a lower probability than "I". Hence, this avoids "/NVEST" word to be included in the set of words. At step 408, a set of words corresponding to the same location in multiple processed versions 106 of image 102 is created, based on the probability distribution of the occurrence of characters in the word.

At step 410, database of words and locations 112 is searched for potential matches corresponding to the set of words created at step 408. Each of the potential matches is assigned a matching score. The matching scores are assigned by processor 110 based on both the probability distribution of the occurrence of characters in a word in the set of words and the similarity between the words and potential matches. For example, consider that the multiple processed versions of an image result in two possibilities for a word, "/NVEST" and "INVEST". If the potential matches in database of words and locations 112 corresponding to these words are "UNVEST" and "INVERT", then "UNVEST" may be preferred and assigned higher matching score than "INVERT". This is because the probability distribution of characters states that the probability of occurrence of character "S" for the fifth letter, is 100%, which means letter "S" is more certain than character "I", the first letter, for which the probability of occurrence is 50%. Hence, the potential match for the word is "UNVEST", which has the letter 'S' in the fifth place, since it is more certain that the fifth character is "S". At step 412, a word in the text is replaced by processor 110 with a word in the set of words based on its matching score. For example, in the case discussed above, the words "/NVEST" and "INVEST" will be replaced by the word "UNVEST". In an embodiment of the invention, a word in the set of words is replaced by a word from the database of words with the maximum matching score.

Figure 5:
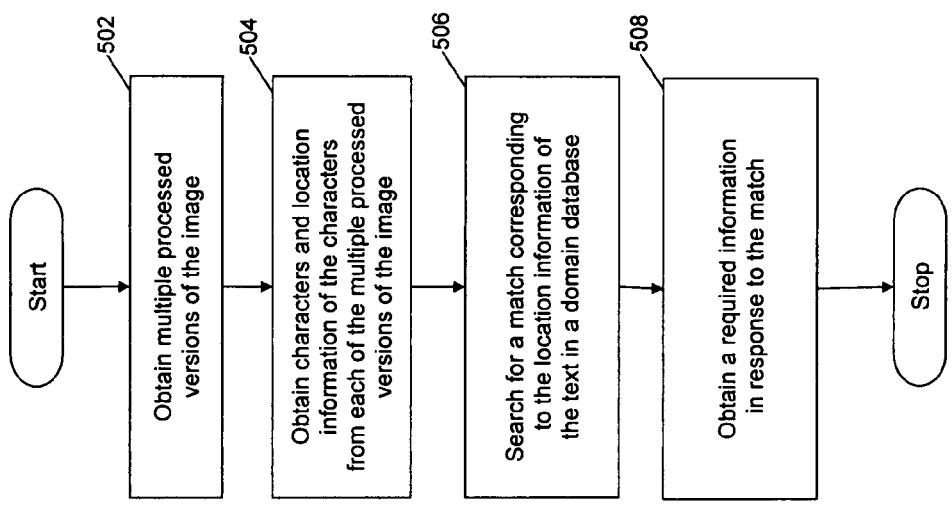
FIG. 5 is a flowchart of a method for obtaining information from an image, in accordance with an embodiment of the invention.

FIG. 5 is a flowchart of a method for obtaining information from an image, in accordance with an embodiment of the invention. At step 502, image 102, as described earlier in conjunction with FIG. 2, is processed by image-processing module 104 to obtain multiple processed versions 106 of image 102. Image-processing module 104 applies different operators to image 102 to form multiple processed versions 106 of image 102. These operators affect at least one characteristic of image 102. At step 504, character and location information of the characters from each multiple processed version 106 of image 102 are obtained by optical character recognition system 108. The location information of the characters includes information regarding the pixel coordinates of the characters in the text. At step 506, the location information of the image 102 is searched for a match in the database of words and locations 112. The domain database includes a set of templates, including the location information, corresponding to various categories of signs. For example, a product label template for a specific retail chain has price, product specification, and product code in some specified location in the product template. Hence, when the character and location information of the characters from step 504 is searched for a match with a template of the product tag, the location of the price tag, product specification and product code in the product tag are matched with locations of the price tag, product specification, and product code in the product templates stored in the domain database. At step 508, information such as manufacturer's name, product type, product price, product specification, and so forth is found easily in the domain database because this information can be searched based on the potential location of the information in image 102. In addition, the retail chain can be identified from the template that matched. For example, as shown in FIG. 2, image 102, the price information lies on the right side of the template with a large font size, the model number is on the second line on the left side, the manufacturer is on the top line, the product title is below the model number, and so forth. Therefore, if a user matches the location of the characters of the text with the locations of characters in a template for this retail chain, ambiguities regarding the characters corresponding to the brand, model, title, and price can easily be resolved.

In accordance with an embodiment, the invention provides improved ability to recognize text in an image where the assumptions underlying current OCR technology are violated. These assumptions include bright, uniform lighting of the text, no relative motion between the camera and the text during the exposure, precise focus of the camera's aperture, and proper alignment between the plane containing the text and the focal plane of the camera. Further, the invention provides improved ability to determine the information, such as product price, product specification, product code, retailer, and so forth, from an image. Moreover, the invention provides improved ability to determine a product, such as shoes, headphones, cameras and so forth, corresponding to a descriptive label of the product in a store.

The system, as described in the invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the invention.

The computer system comprises a computer, an input device, a display unit and the Internet. The computer comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions on the computer system.

The computer system executes a set of instructions that are stored in one or more storage elements, to process input data. The storage elements may also hold data or other information, as desired, and may be an information source or physical memory element present in the processing machine.

The set of instructions may include various commands that instruct the processing machine to execute specific tasks such as the steps constituting the method of the invention. The set of instructions may be in the form of a software program. The software may be in various forms such as system software or application software. Further, the software may be in the form of a collection of separate programs, a program module with a larger program, or a portion of a program module. The software may also include modular programming in the form of object-oriented programming. Processing of input data by the processing machine may be in response to user commands, to the results of previous processing, or to a request made by another processing machine.

While the embodiments of the invention have been discussed and described, the invention is not limited to these embodiments only. A number of changes and modifications can be thought of, without moving away from the scope of the invention, as discussed in the claims.

What is claimed is:

1. A computer-implemented method for improving recognition of text present in an image, the method comprising:
   under the control of one or more computer systems configured with executable instructions,
      obtaining multiple processed versions of an image of a text, wherein the multiple processed versions of the image are obtained by applying different operators to the image;
      obtaining characters and location information of the characters in the text from each of the multiple processed versions of the image, wherein the location information comprises pixel coordinates of the characters in the text; and
      editing the text based on the obtained location information of the characters to improve the recognition of the text in the image by removing, for each two adjacent words in the text, a space between a first word and a second word based on a horizontal distance between an end of the first word and a beginning of the second word.

2. The computer-implemented method of claim 1, wherein editing the text comprises:
   calculating a probability distribution of occurrence of each character in a word in the text corresponding to a location of the character in the multiple processed versions of the image;
   creating a set of words corresponding to the location from the multiple processed versions of the image based on the probability distribution of occurrence of the characters in the word.

3. The computer-implemented method of claim 2, wherein editing the text further comprises:
   searching a database for potential matches corresponding to at least one word in the set of words; and
   replacing the at least one word with one of the potential matches based on matching scores assigned to the potential matches, wherein the matching scores are assigned based on the probability distribution of occurrence of the characters in the at least one word and the similarity between the at least one word and the potential matches.

4. The computer-implemented method of claim 1, wherein removing the space between the first word and the second word comprises verifying whether the horizontal distance between the end of the first word and the beginning of the second word is less than a predefined separation threshold, wherein the predefined separation threshold is a function of heights of the characters in the first word and the second word.

5. The computer-implemented method of claim 1, wherein editing the text further comprises joining a first word and a second word that have been detected as separate entities, based on a vertical alignment between the first word and the second word and based on a horizontal distance between the end of the first word and the beginning of the second word.

6. The computer-implemented method of claim 5, wherein joining the first word and the second word comprises:
   verifying whether a vertical overlap between minimum bounding rectangles of the last character of the first word and first character of the second word is greater than a predefined percentage of a function of the rectangles' heights;

verifying whether the horizontal distance between the end of the first word and the beginning of the second word is less than a predefined separation threshold, wherein the predefined separation threshold is a function of the heights of the characters in the first word and the second word; and inserting a space between the words if the horizontal distance is greater than the predefined separation threshold.

7. The computer-implemented method of claim 1, wherein editing the text further comprises joining two lines of text into a single paragraph of text by:

verifying that average heights of the characters in the two lines are within a predefined range of each other;

verifying that vertical distances between pairs of vertically aligned characters are less than a function of the larger of the heights of the characters in the two lines; and combining the two lines into a single entity such that a lower line of the two lines is defined to be adjacent to and follows an upper line of the two lines.

8. The computer-implemented method of claim 1, wherein editing the text further comprises splitting a word into two words based on a horizontal distance between two adjacent characters in the word by verifying whether a horizontal distance between each of the two adjacent characters in the word is greater than a predefined separation threshold.

9. The computer-implemented method of claim 1, wherein editing the text further comprises replacing a character in the word with a plurality of characters by comparing a width of the character to a predetermined width threshold, determining a number of characters corresponding to a ratio of the excess of the predetermined threshold of the character width, and substituting the character with the determined number of characters, wherein the substitute characters are obtained by matching the word having the character to be substituted with words of the same length retrieved from a database so as to form a meaningful word.

10. The computer-implemented method of claim 1, wherein editing the text further comprises identifying a monetary value corresponding to a numeric representation in the text by:

detecting the height of each digit in the numeric representation; and introducing a decimal point between adjacent digits when the heights of the last two digits are less than a predefined percentage of the heights of the preceding digits.

11. A computer-implemented method for obtaining information from an image, the method comprising:

under the control of one or more computer systems configured with executable instructions, processing an image of a text to obtain multiple processed versions of the image, wherein the multiple processed versions of the image are obtained by applying different operators to the image;

obtaining characters and location information of the characters in the text from each of the multiple processed versions of the image, wherein the location information comprises pixel coordinates of the characters in the text;

matching the location information of the characters in the text to location information of characters in each of a plurality of templates stored in a domain database, each template comprising location information of characters corresponding to a text pattern; and if the match is found, obtaining, from the matched template, information corresponding to a text pattern.

12. The computer-implemented method according to claim 11, wherein the text pattern defines a product label.

13. The computer-implemented method according to claim 11, wherein the information corresponding to a text pattern includes a product type, a product price, and a manufacturer's name.

14. A computer system for improving recognition of a text in an image, comprising a processor and a memory having executable instructions that, when executed on the processor, cause the processor to:

obtain characters and location information of the characters in the text from multiple processed versions of the image of the text, wherein the location information comprises the pixel coordinates of the characters in the text; and edit the text in the image based on the obtained location information of the characters to improve the recognition of text by removing, for each two adjacent words in the text, a space between a first word and a second word based on a horizontal distance between an end of the first word and a beginning of the second word.

15. The computer system according to claim 14 wherein the executable instructions further cause the processor to apply different operators to the image to obtain the multiple processed versions of the image.

16. The computer system according to claim 14, wherein the executable instructions further cause the processor to edit a word in the text based on a probability distribution of the characters in the word corresponding to a location of the characters in the multiple processed versions of the image.

17. The computer system according to claim 14, wherein the executable instructions further cause the processor to edit the text based on comparison of a word with words stored in a database.

18. The computer system according to claim 14, wherein the executable instructions further cause the processor to join a first word and a second word in the text that have been detected as separate entities.

19. The computer system according to claim 14, wherein the executable instructions further cause the processor to join two lines of text that have been detected as separate entities into a paragraph.

20. The computer system according to claim 14, wherein the executable instructions further cause the processor to split a word in the text based on a horizontal distance between characters in the word.

21. The computer system according to claim 14, wherein the executable instructions further cause the processor to replace a character in a word in the text with a plurality of characters based on the width of the character in the word.

22. The computer system according to claim 14, wherein the executable instructions further cause the processor to identify a monetary value corresponding to a numeric representation in the text.

23. A non-transitory computer-readable storage medium containing instructions for improving recognition of a text in an image that, when executed on a computer, cause the computer to:

obtain multiple processed versions of the image of a text, wherein the multiple processed versions of the image are obtained by applying different operators to the image;

obtain characters and location information of the characters from each of the multiple processed versions of the image, wherein the location information comprises the pixel coordinates of the characters in the text; and edit the text based on the obtained location information of the characters to improve the recognition of the text in the image by removing, for each two adjacent words in the text, a space between a first word and a second word based on a horizontal distance between an end of the first word and a beginning of the second word.

24. A computer-implemented method improving recognition of a text in an image, comprising:

under the control of one or more computer systems configured with executable instructions, processing an image of a text to obtain multiple processed versions of the image, wherein the multiple processed versions of the image are obtained by applying different operators to the image;

obtaining characters and location information of the characters in the text from each of the multiple processed versions of the image, wherein the location information comprises pixel coordinates of the characters in the text;

for each two adjacent words in the text, removing a space between a first word and a second word based on a horizontal distance between an end of the first word and a beginning of the second word;

calculating a probability distribution of occurrence of each character in each word of the text the characters in the word corresponding to the obtained location information of the characters in the multiple processed versions of the image;

creating a set of words based on the calculated probability distribution of the occurrence of each character in each word;

searching for matches between words in the created set of words and words stored in a database of words, each match being assigned a matching score based on the calculated probability distribution of the occurrence of each character in each word in the set of words and similarity between a word in the set and each of matching words found in the database; and for each word in the set of words for which at least one matching word is found, replacing the word with a matching word having a highest matching score of the found matching words.

* * * * *